United States Patent [19]
Eckel et al.

[11] Patent Number: 6,138,241
[45] Date of Patent: Oct. 24, 2000

[54] APPARATUS FOR AND METHOD OF INHIBITING AND OVERRIDING AN ELECTRICAL CONTROL DEVICE

[75] Inventors: David P. Eckel, Eaton's Neck; Gaetano Bonasia, Bronx, both of N.Y.

[73] Assignee: Leviton Manufacturing Co., Inc., Little Neck, N.Y.

[21] Appl. No.: 09/045,625

[22] Filed: Mar. 20, 1998

[51] Int. Cl.[7] ............................... G06F 1/26; G06F 1/28; G06F 1/30

[52] U.S. Cl. ..................... 713/300; 713/310; 713/322; 713/323; 713/324; 713/330; 713/340; 713/400; 713/601; 323/239; 323/271; 323/275; 323/905; 323/909; 323/320; 315/320; 315/DIG. 4; 315/86

[58] Field of Search ..................... 713/300, 310, 713/322, 323, 324, 330, 340, 400, 601; 323/239, 271, 275, 905, 909, 320; 315/320, DIG. 4, 86

[56] References Cited

U.S. PATENT DOCUMENTS

| | | |
|---|---|---|
| 4,167,786 | 9/1979 | Miller et al. ............................ 364/493 |
| 4,745,351 | 5/1988 | Rowen et al. .......................... 323/239 |
| 4,797,599 | 1/1989 | Ference et al. ......................... 315/194 |
| 5,237,207 | 8/1993 | Kwiatkowski et al. ................. 307/31 |
| 5,247,264 | 9/1993 | Cripe ...................................... 330/251 |
| 5,327,123 | 7/1994 | Heimann et al. ....................... 340/916 |
| 5,373,411 | 12/1994 | Grass et al. .............................. 361/64 |
| 5,438,684 | 8/1995 | Schwent et al. ......................... 455/89 |
| 5,576,700 | 11/1996 | Davis et al. ....................... 340/825.16 |
| 5,734,230 | 3/1998 | Edwards et al. ......................... 315/86 |

*Primary Examiner*—Ayaz R. Sheikh
*Assistant Examiner*—Frantz Jean
*Attorney, Agent, or Firm*—Paul J. Sutton

[57] ABSTRACT

An apparatus for and method of inhibiting and overriding the normal operating mode of one or more input devices connected to a communications network. The present invention functions within an electrical network made up of a plurality of input devices wherein a group of input devices is capable of commanding an electrical control device to apply and remove electrical power from an electrical load connected thereto. The input devices or nodes communicate with the electrical control device over a communications network. When one of the input devices is turned off, the normal operating mode of all the other input sensors is inhibited. The electrical control device remains inhibited until all the input devices are no longer in the off position. Thus, electrical power to the load controlled by the electrical control device remains disconnected until all input devices are in the on position. Local and remote signaling, control and indication diagnostic and monitoring functions are also provided.

6 Claims, 6 Drawing Sheets

APPARATUS FOR AND METHOD OF INHIBITING AND OVERRIDING AN ELECTRICAL CONTROL DEVICE

FIELD OF THE INVENTION

The present invention relates to electrical devices and more particularly relates to an apparatus for and method of inhibiting an electrical control device connected to a communications network.

BACKGROUND OF THE INVENTION

A growing trend within the electrical device industry is to enable previously stand alone electrical devices, such as sensors and lighting control devices, to communicate with each other over some type of communications network. Previously, sensor, switch and control devices communicated using point to point connections. Nowadays, manufacturers are building into these devices communication means to enable them to communicate over local area networks (LANs). A variety of systems are currently commercially available which electrical device manufacturers can integrate into their products to enable them to communicate over a network.

One such system is the CEBus system which has been made an EIA standard, the EIA 600 standard, and was originally developed by Intellon Corp. A second system is the LonWorks system commercially available from and developed by Echelon Corp. Both the CEBus and LonWorks systems specify physical and link layer means for communicating over a variety of different media including power line, coaxial cable, fiber optic cable, radio frequency (RF), infrared (IR) and twisted pair cable.

For example, in the area of lighting, it is possible to wire an electrical load to multiple switches such that turning any of the switches on functions to turn the load on. The wiring circuits for two and three way switches are well known and relatively simple to implement. As the number of switches increases, e.g., four way, five way and beyond, the wiring circuits become extremely complicated and unwieldy.

Utilizing one of these systems makes it much easier to design electrical systems which comprise a plurality of different sensing and control devices. Using the lighting example presented above, it is a straight forward application to implement a lighting system whereby multiple sensors or switches control the same lighting control device. For example, each device within a mixture of multiple occupancy sensors, switches or other types of sensor/switch devices can be configured to activate and control the same lighting control device.

However, a disadvantage is when maintenance or service is required to be performed on any of the input sensing or dimming devices controlling or connected to the same lighting control device. Although one of the devices is disabled or placed in an off mode, any of the other devices is still free to activate the application of electrical power to the load.

SUMMARY OF THE INVENTION

The present invention is an apparatus for and method of inhibiting and overriding the normal operating mode of one or more input devices connected to a communications network. The present invention is intended to function within an electrical network that is made up of a plurality of input devices wherein a group of input devices is capable of commanding an electrical control device to apply and remove electrical power from an electrical load connected thereto. The input devices or nodes communicate with the electrical control device over a communications network. Such electrical networks can be implemented, for example, utilizing the CEBus (EIA-600 standard) or LonWorks communications systems.

The input devices may comprise any type of sensor such as an occupancy sensor or may comprise a switch or dimming control input. The electrical control device may comprise any switching or dimming control device such as a common circuit breaker or other load breaking/dimming device.

When one of the input devices is turned off, the present invention is operative to inhibit the normal operating mode of all the other input sensors. Note that throughout this document, 'turning a device off' includes switching the device off, disabling the device, placing the device in standby mode or tripping the device. There can be multiple input devices simultaneously in the off, disabled, standby or tripped mode. The electrical control device remains inhibited until all the input devices are no longer in the off, disabled, standby or tripped mode. Thus, electrical power to the load controlled by the electrical control device remains disconnected until all input devices are in the on position.

The present invention is particularly suited to permit maintenance or service to be performed in a safe manner on any of the input devices logically connected to the same electrical control device, i.e., switching or dimming control device. The present invention has been embodied in a series of electrical device products that have been adapted to operate in a Lon Works system. For example, the occupancy sensor catalog no. L778-T and the dimming control unit catalog no. L206-CT, both manufactured by Leviton Manufacturing Co., Inc., Little Neck, N.Y. implement the method of the present invention.

Each input device comprises switch means for placing the input device into an off, disabled, standby, tripped or maintenance inhibit mode. The switch means can be implemented using mechanical or electronic means or a combination of the two either at the device itself or remotely over a network via one or more control commands. A pull out tab or mechanical arm can be used to put the input device into the maintenance off mode when it is pulled out. The pull out tab or mechanical arm would leave the input device in normal operating mode when pushed back in.

In either case, when the input device is placed in the off position, an inhibit message is sent to the electrical control device. In response, electrical power to the attached load is removed. Subsequently, all other input devices are inhibited from applying power to said load. This permits safe access to the electrical control device or to the load for service or maintenance reasons. The normal operating mode of all the input devices connected to the same electrical control device is inhibited or overridden. Until all input devices that have previously been placed in the off mode are put into the on mode and returned to their normal operating condition, all input devices are not permitted to change the state of the load or the electrical control device.

Local and remote signaling, control and indication (on a network management tool, for example) is also provided when any device is being tested, fails or passes the tests, fails, requires testing or is in a degraded state and is about to fail. This includes remote diagnostic monitoring and control by a remote entity such as a network management tool connected to the network. Nodes report their status either automatically at periodic intervals or in response to queries by a management entity.

There is thus disclosed in accordance with the present invention a method of inhibiting the normal operating mode of a plurality of nodes logically connected to an electrical control device, the method comprising the steps of placing at least one of the nodes into the off state, communicating to the electrical control device the fact that the node has been placed on the off sate and inhibiting the electrical control device, in response to the communication, from activating an electrical load connected thereto until each of the plurality of nodes is removed from the off state.

In addition, the plurality of nodes and the electrical control device are adapted to communicate over a communications network. The plurality of nodes and the electrical control device may be adapted to operate in a LonWorks compatible system or a CEBus compatible system. The method also comprises the step of providing switch means at each node permitting a user to place the node in the off state. The method also comprises the step of inhibiting each node from instructing the electrical control device to apply electrical power to the electrical load.

The method also comprises the steps of maintaining a table of node identifiers, adding an identifier associated with a node to the table when a node has been placed in the off state, removing the identifier associated with a node from the table when the node has been removed from the off state and enabling the electrical control device to activate an electrical load connected thereto when all node identifiers have been removed from the table, wherein the node identifier may comprise the address of the node.

There is also disclosed in accordance with the present invention, in an electrical network including a plurality of input devices and an electrical control device coupled to and controlling electrical power to an electrical load, the input devices and the electrical control device adapted to communicate over a communications network, a method of inhibiting the normal operation of the input devices, the method comprising the steps of inhibiting an input device in response to it being placed in the off state, transmitting an inhibit message from the input device to the electrical control device, removing electrical power from the load in response to the inhibit message, inhibiting the electrical control device from responding to commands issued by any of the input devices to apply electrical power to the load until all input devices are removed from the off state, transmitting a feedback inhibit message from the electrical control device to each of the input devices and inhibiting all input devices from activating the electrical control device to apply electrical power to the load until all input devices are removed from the off state.

Further, there is provided in accordance with the present invention an apparatus for inhibiting the normal operating mode of a plurality of nodes logically connected to an electrical control device, comprising means for placing at least one of the nodes into the off state, means for communicating to the electrical control device the fact that the node has been placed in the off state and means for inhibiting the electrical control device, in response to the communication, from activating an electrical load connected thereto until each of the plurality of nodes is removed from the off state.

BRIEF DESCRIPTION OF THE DRAWINGS

The invention is herein described, by way of example only, with reference to the accompanying drawings, wherein.

DETAILED DESCRIPTION OF THE INVENTION

Figure 1:
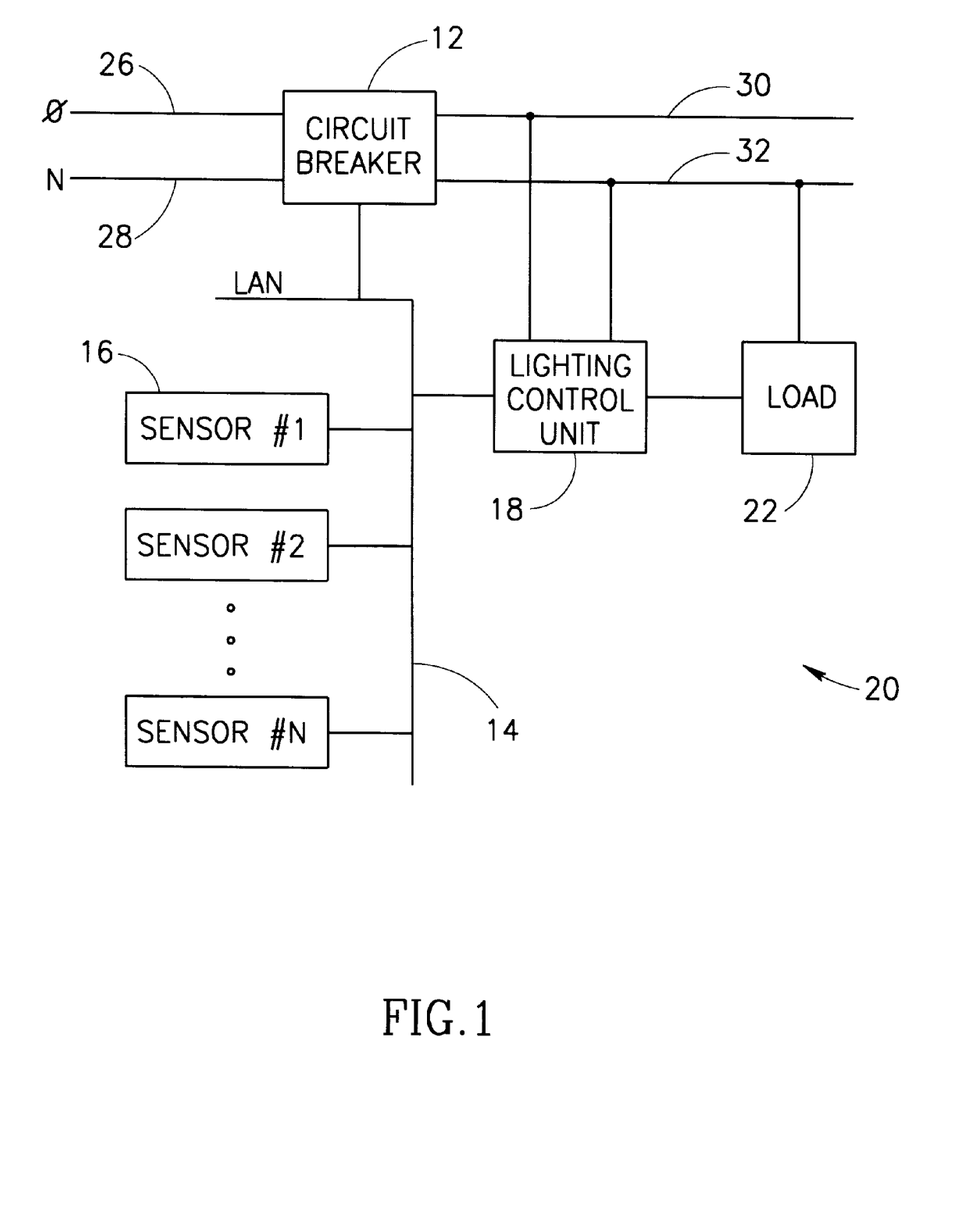
FIG. 1 is a schematic diagram illustrating an example electrical device system wherein each element comprises communications means for communicating over a communications network.

A schematic diagram illustrating an example electrical device system wherein each element comprises communications means for communicating over a communications network is shown in FIG. 1. The electrical network, generally referenced 20, comprises a plurality of sensing devices 16 labeled sensor #1 through sensor #N, an electrical control device 18 such as a lighting control device and a communications network represented by the LAN 14. Electrical power to the load 22 is controlled by the lighting control unit 18. One end of the load 22 is coupled to the neutral line 32 and the other end to a load control line output from the lighting control unit 18. Line side phase and neutral lines 26, 28, respectively, are electrically connected to a circuit breaker 12. Optionally, the circuit breaker 12 also comprises communication means integral therewith for communicating to other devices connected to the LAN 14. Lighting control unit 18 receives electrical power through load side phase and neutral lines 30, 32, respectively.

Note that the example electrical network 20 shown in FIG. 1 is presented to aid in understanding the principles of the present invention. Other network configurations comprising different sensors and/or electrical control devices can be used without departing from the spirit of the present invention. Particularly, in addition to the sensors 16, other types of devices can be used, including but not limited to, switches, dimming input devices, touch input switching or dimming devices, etc. Similarly, in addition to the lighting control unit 18, any type of electrical control device can be used, including but not limited to, circuit breaker type devices, dimming controls, switching controls or any other type of load breaking or dimming device.

In one embodiment of the electrical network 20, one of the electrical devices connected to the phase and neutral power lines comprises power supply means for providing a low voltage supply to the sensors or other input type devices 16. In addition, the electrical network 20 is configured such that any of sensors #1 through #N has the ability to cause the lighting control unit 18 to turn electrical power to the load 22 on and off. Each of the sensor devices 16, circuit breaker 12 and control device 18 comprises means for communicating to other devices over a communications network or communications bus such as LAN 14. As described in the Background section of this document, such means may comprise any commercially available control/communications system such as the CEBus (EIA-600 standard) or LonWorks (Echelon) systems. Further, the LAN 14 may comprise any suitable communication media such as twisted pair, power line, IR, RF, coaxial cable or fiber optic cable.

The method of the present invention inhibits and effectively overrides the normal operation of an electrical device that is connected to the communication network thus providing a known status and safe operating condition for all the nodes in the group or subsystem. Using the method, maintenance or service can be performed on any of the devices, i.e., sensors 16, connected to the control device 18 regardless of whether the control device is a switching or dimming control device, common circuit breaker, branch circuit breaker or other local switching/dimming control unit or switching/dimming device. The method functions to open and disconnect power to the load, such as a lighting load, when any of the sensors in switched into the inhibit or off state. This assumes that all the input devices, i.e., sensors #1 through #N, are logically bound together (using standard LonWorks terminology) such that they control the same switching or dimming control device 18. When any of the input devices is placed in the off state, i.e., maintenance or maintenance inhibit mode, all the other input devices are inhibited or prevented from causing electrical power to be applied to the load. Thus, regardless of the state of the various inputs applied to the other input devices, the load remains disconnected from the electrical power.

The method of the present invention is particularly suited when utilized in a twisted pair system wherein the switching/dimming control device is localized and separate from the sensor/switch input. Note further that the same sensor/switch can be bound or connected with multiple control devices. Each control device 18 can be bound or connected to multiple sensor/switch input devices.

It is important to note that it is not recommended that the method of the present invention be used in lieu of opening the branch circuit breaker to disconnect electrical power to the load. Preferably, the method is used as a supplemental means to disconnect electrical power to the load and the switching/dimming control unit.

Figure 2:
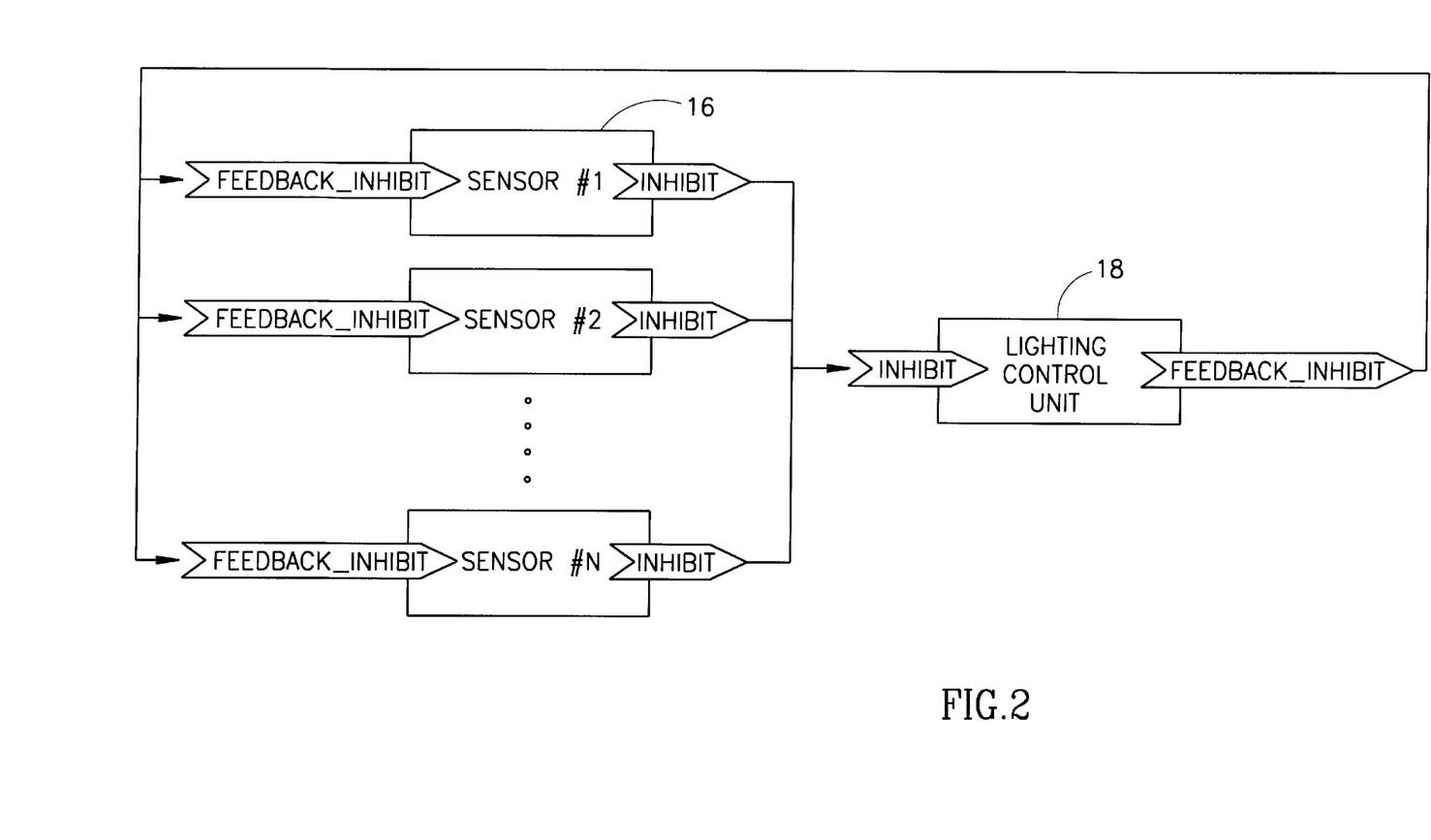
FIG. 2 is a high level block diagram illustrating the inhibit and feedback mechanisms within an example electrical network comprising multiple sensors controlling a single electrical control device.

A high level block diagram illustrating the inhibit and feedback mechanisms within an example electrical network comprising multiple sensors 16 controlling a single electrical control device 18 is shown in FIG. 2. As described previously above, each of the sensors 16, comprises switch means for turning the sensor operation on and off. When the switch is on, the sensor operates to transmit its state to the lighting control unit 18. The switch can be implemented either mechanically or electronically or a combination of the two. A slide switch may be utilized for placing the input device into the off state or maintenance inhibit mode.

The input device, e.g., sensor 16, may comprise a sensing, switch input or dimming input device. In the example presented in FIGS. 1 and 2, the input devices are sensors comprising passive infrared (PIR) occupancy sensors which function to transmit the presence or absence of motion within their field of view. Thus, if all sensors are operating and logically bound (using standard LonWorks terminology) to the lighting control unit, then motion detected by any of the N sensors 16 will cause the lighting control unit 18 to apply electrical power to the load.

When a sensor is turned off, it means that even if the sensor detects motion within its field of view, the lighting control unit is not instructed to apply electrical power to the load. Thus, using a LonWorks network as an example, if a sensor 16 is turned off, i.e., placed in inhibit or maintenance mode, no messages are sent to the lighting control unit 18 instructing it to turn the load 22 on, regardless of the fact that motion is detected by the sensor 6.

When any one of the sensors 16 is turned off, the lighting control unit 18 must be blocked, i.e., inhibited, from responding to requests from other sensors 16 to turn the load 22 on. This is achieved by communicating the fact that a sensor 16 has been placed in the off state to the lighting control unit 18. Once the lighting control unit 18 is informed that one of its controlling sensors 16 is off, it disregards further instructions to turn or off from all sensors 16.

With reference to FIG. 2, each sensor 16 maintains two entities (state variables): INHIBIT and FEEDBACK_INHIBIT. Each entity can have one of two states: on or off. Under normal non-inhibited conditions, the value of INHIBIT in each sensor is set to off. When a sensor 16 has been turned off, the value of INHIBIT is set to on and a message is sent to the lighting control unit 18 informing it that the sensor 16 has been turned off. When this message is received by the lighting control unit 18, an identifier associated with the sensor is stored in a table or array. Preferably, the identifier is a unique entity associated with an input device such as its address. The table is of size N, with sufficient storage allocated for each sensor 16 in the group. Once the message is received, the lighting control unit 18 removes electrical power to the load 22 if power was previously applied and is inhibited from responding to instructions from other sensors 16 to turn the load 22 on.

In addition, upon receipt of the inhibit message, the lighting control unit 18 sets its FEEDBACK_INHIBIT, normally off, to on. It then communicates to all N sensors 16 that it has been inhibited and will not respond to instructions to apply electrical power to the load 22. Upon receipt of the FEEDBACK_INHIBIT state variable, each sensor 22 places itself in an inhibit mode and refrains from sending commands to the lighting control unit to apply electrical power to the load.

Note that each sensor that is turned off, e.g., via switch means within the sensor, sends an inhibit message to the lighting control unit 18. The lighting control unit 18 keeps track of which sensors 16 have been placed in the off state. The value of FEEDBACK_INHIBIT will not change to off until all the sensors 16 that have been previously placed in the off state are removed from the off state. Thus, if two sensors 16 have been turned off and one is later turned back on, the lighting control unit 18 remains inhibited until the second sensor 16 is turned on.

Note that the switch means within each sensor 16 may comprise any suitable switching apparatus either mechanical and/or electrical such as a button, slide or rocker switch.

Figure 3:
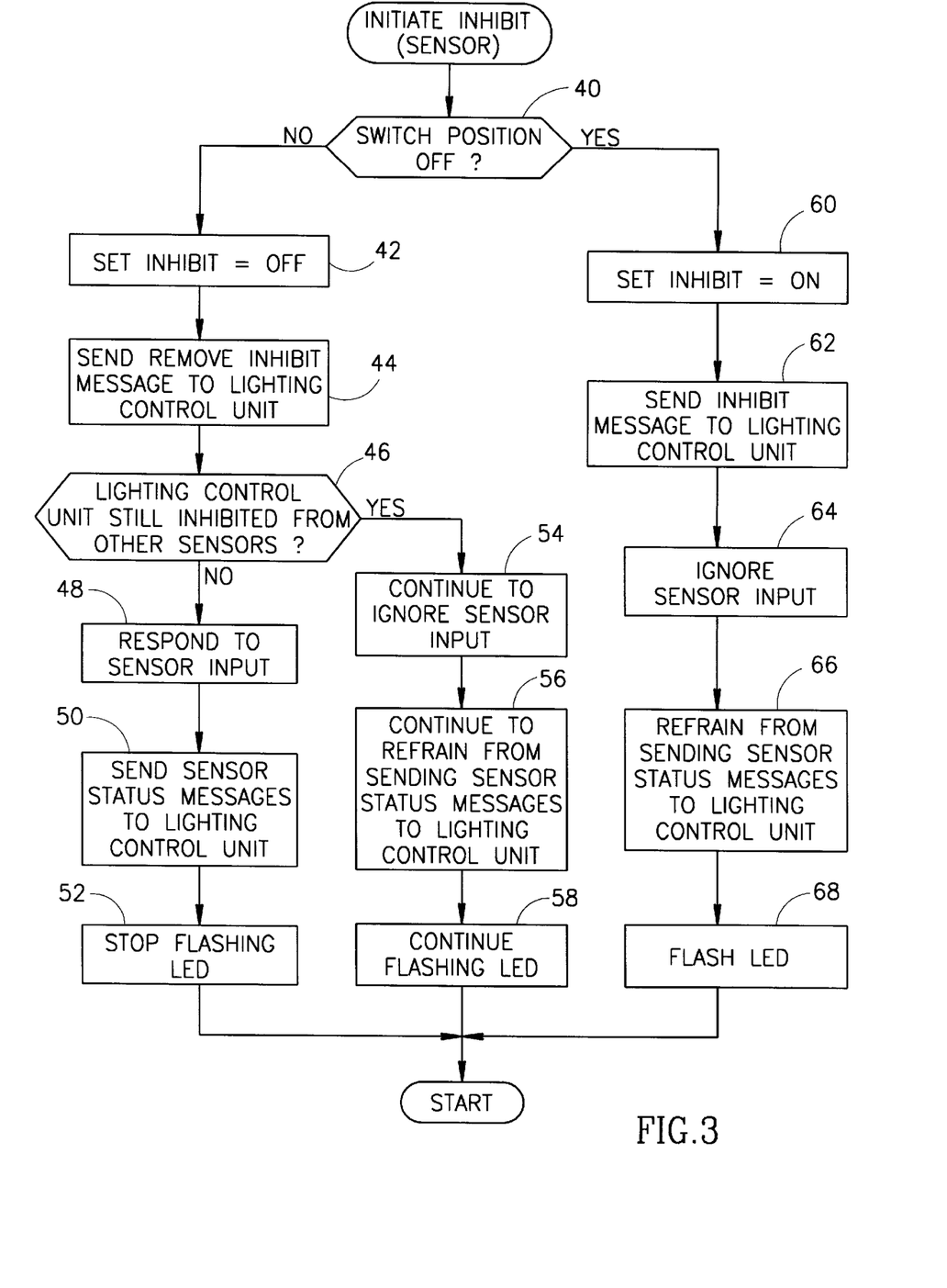
FIG. 3 is a flow diagram illustrating the inhibit method of the present invention as executed within the sensor device.

A flow diagram illustrating the inhibit method of the present invention as executed within the sensor device 16 is shown in FIG. 3. It is assumed that the controller within the sensor 16, e.g., microprocessor or other suitable processing means, is able to acquire the state of the switch either by periodically scanning or other means. The sensor 16 thus periodically checks whether the switch has been turned off (step 40). When the switch is detected to be in the off position, the state of INHIBIT is set to on (step 60). An inhibit message is then sent to the lighting control unit 18 (step 62). The effect of the inhibit message is to cause the light control unit 18 to immediately turn off electrical power to the load 22 and prevent the lighting control unit 18 from responding to instructions from other sensors 16 to turn electrical power to the load on 22.

Once inhibited, the sensor 16 ignores the presence or absence of motion. Thus, motion within its field of view is ignored (step 64). The sensor 16 itself is also inhibited from sending further command messages, i.e., motion detected or not detected, to the lighting control unit 18 regardless of whether motion is detected (step 66). Optionally, a visual indicator such as an LED located on the sensor can be flashed using a predetermined flash pattern to signify to the user that the sensor has been inhibited from responding to further sensor input (step 68).

If the switch was previously off and has been switched back on (step 40), the state of INHIBIT is set to off (step 42). A message is sent to the lighting control unit 18 informing it that the sensor 16 has been removed from the off state (step 44). In response, the lighting control unit will change the state of FEEDBACK_INHIBIT to off, provided that no other sensor 16 is still in the off state, i.e., its switch is still in the off position. The sensor 16 then checks the state of the FEEDBACK_INHIBIT variable which conveys whether the light control unit is still inhibited from other sensors (step 46). If no other sensors are in an inhibit state, the sensor 16 resumes responding to sensor 16 input, i.e., motion (step 48). Also, the sensor 16 resumes sending sensor status messages to the lighting control unit 18 conveying the state of occupancy for that sensor 16 (step 50). The LED stops being flashed (step 52).

If the value of FEEDBACK_INHIBIT remains on (step 46), the sensor continues to ignore sensor 16 input (step 54). Also, the sensor 16 continues to refrain from sending occupancy messages to the lighting control unit 18 (step 56). The LED also continues to be flashed (step 58).

Figure 4:
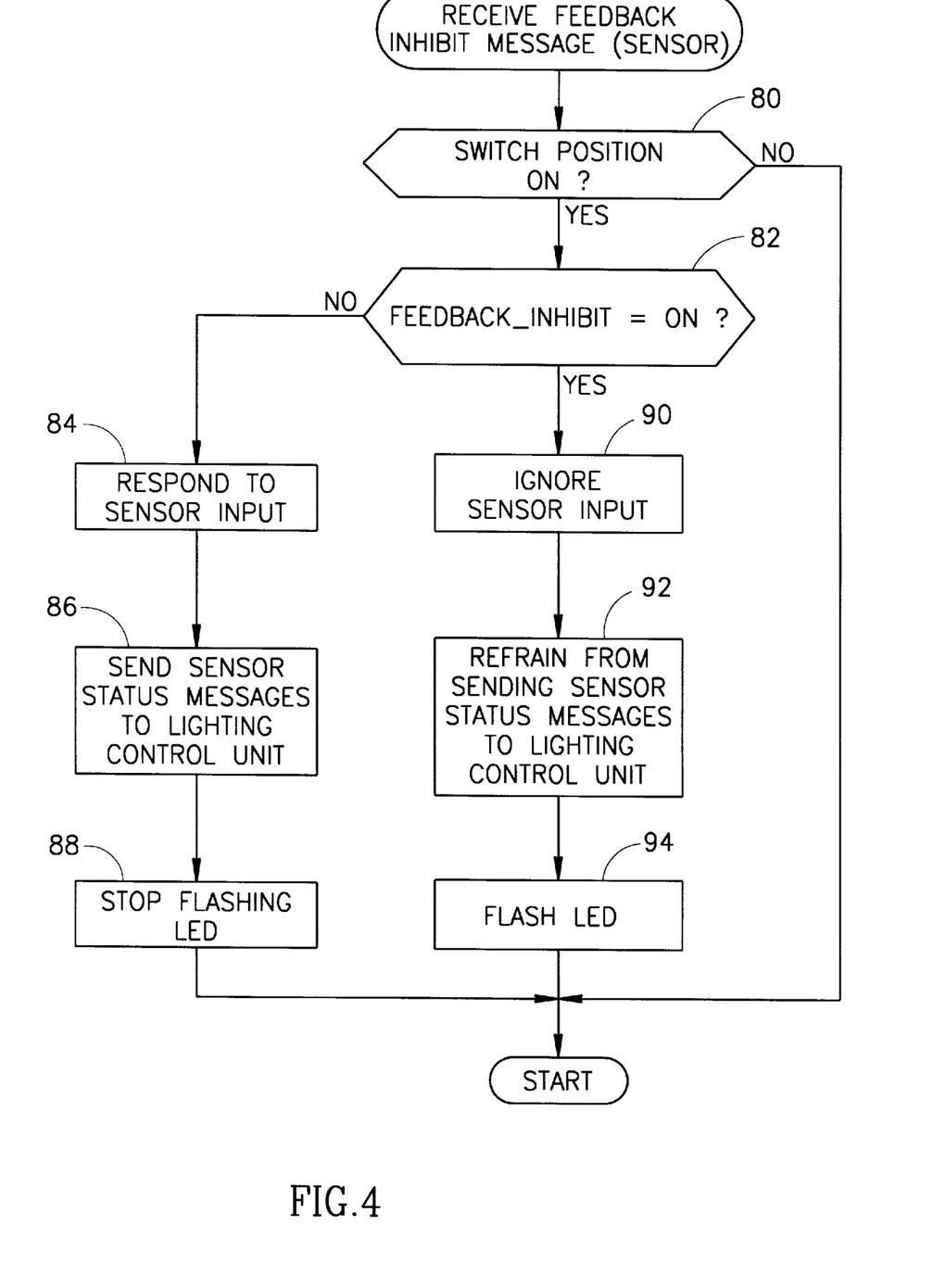
FIG. 4 is a flow diagram illustrating the feedback inhibit method of the present invention as executed within the sensor device.

A flow diagram illustrating the feedback inhibit method of the present invention as executed within the sensor device 16 is shown in FIG. 4. This method is performed in the sensor 16 whenever a feedback inhibit message is received from the lighting control unit 18. First the position of the sensor's switch is determined (step 80). If the switch position is off, the method terminates since the sensor is already inhibited, i.e., in the off state. Note that that particular sensor 16 may be the one to have caused the lighting control unit 18 to become inhibited and generate the feedback inhibit messages to all the sensors 16.

If the switch position is on (step 80), the state of the FEEDBACK_INHIBIT variable is examined (step 82). If it is on, i.e., the lighting control unit 18 is inhibited, the sensor 16 is placed in inhibit mode in response thereto. Thus, the sensor 16 ignores the presence or absence of motion within its field of view (step 90). The sensor also is inhibited from sending command messages, i.e., occupancy messages, to the lighting control unit 18 regardless of whether motion is detected (step 92). In addition, an optional visual indicator such as an LED located on the sensor 16 can be flashed using a predetermined flash pattern to signify to the user that the sensor has been inhibited from responding to further sensor input (step 94).

If the switch position is on (step 80) and the state of the FEEDBACK_INHIBIT variable is off (step 82), then the sensor 16 is permitted to respond to motion, i.e., changes in occupancy (step 84). Also, the sensor 16 is permitted to send command messages, i.e., occupancy messages, to the lighting control unit 18 in response to motion detected or not detected (step 86). In addition, the LED ceases to be flashed since the sensor 16 is no longer in inhibit mode (step 88).

Figure 5:
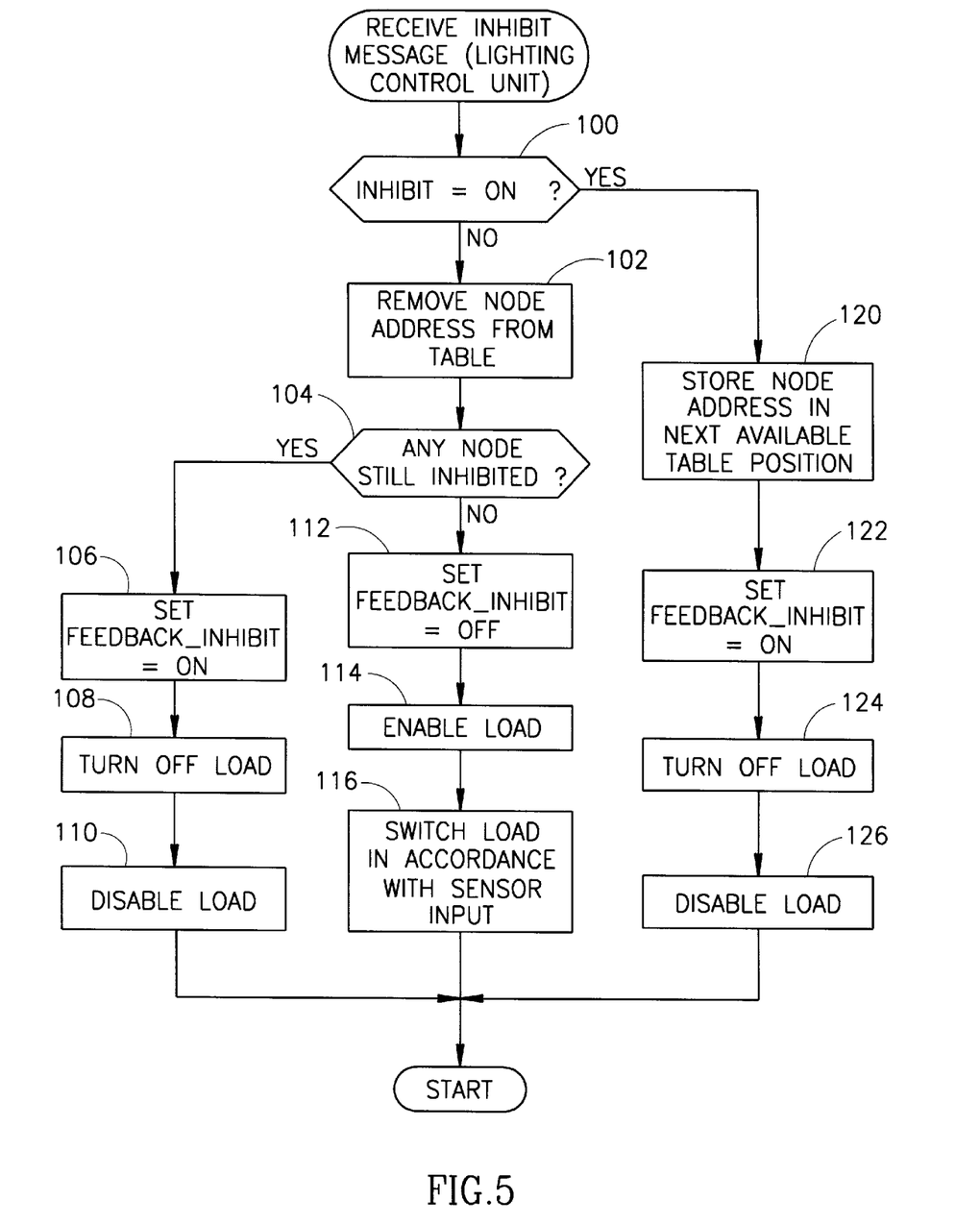
FIG. 5 is a flow diagram illustrating the inhibit method of the present invention as executed within the lighting control device.

A flow diagram illustrating the inhibit method of the present invention as executed within the lighting control device 18 is shown in FIG. 5. This method is performed each time an inhibit message is received from any of the sensors 16 within the group associated with that lighting control unit 18. The inhibit message conveys the state of the INHIBIT variable in a sensor 16. First, the state of the INHIBIT is determined (step 100). If the INHIBIT variable is set to on, i.e., one of the sensors 16 has been inhibited meaning its switch has been turned off, the address of the sensor 16 is stored in a table, array or small database (step 120). The size of the table is large enough to hold separate indications from each of the N sensors 16 within the group. Any identifying entity such as the address of the sensor can be used. It is important that the lighting control unit 18 be able to identify the source of the inhibit message so that later on, it can remove the entry from its table.

Next, the state of the FEEDBACK_INHIBIT variable is set to on (step 122). If electrical power was previously applied to the load 22, it is now removed (step 124). The lighting control unit 18 is then inhibited from responding to any messages instructing it to turn the load 22 on (step 126).

If the INHIBIT variable from the sensor 16 is set to off (step 100) then the entry in the table corresponding to the sensor 16 sending the message is removed (step 102). The address of the sensor 16 is used as a unique number to identify the particular sensor. It is then determined whether there are any remaining entries in the table (step 104). The lighting control unit 18 can only resume responding to sensor 16 input messages when all the sensors are removed from the off state, i.e., are in the not-inhibited state. If one or more sensors remain inhibited (their switches are still in the off position) the lighting control unit 18 remains inhibited.

Thus, if one of the sensors 16 is still inhibited (step 104), the state of FEEDBACK_INHIBIT is set to on (step 106) and electrical power to the load is removed (step 108). Further, the lighting control unit 18 is inhibited from responding to messages from all sensors to turn power to the load on (step 110).

If there are no entries left in the table (step 104) then the state of FEEDBACK_INHIBIT is set to off (step 112) and the lighting control unit 18 is enabled to turn on electrical power to the load 22 (step 114). The lighting control unit 18 is removed from the inhibit mode and is permitted to respond to instructions from any of the sensors 16 (step 116).

Figure 6:
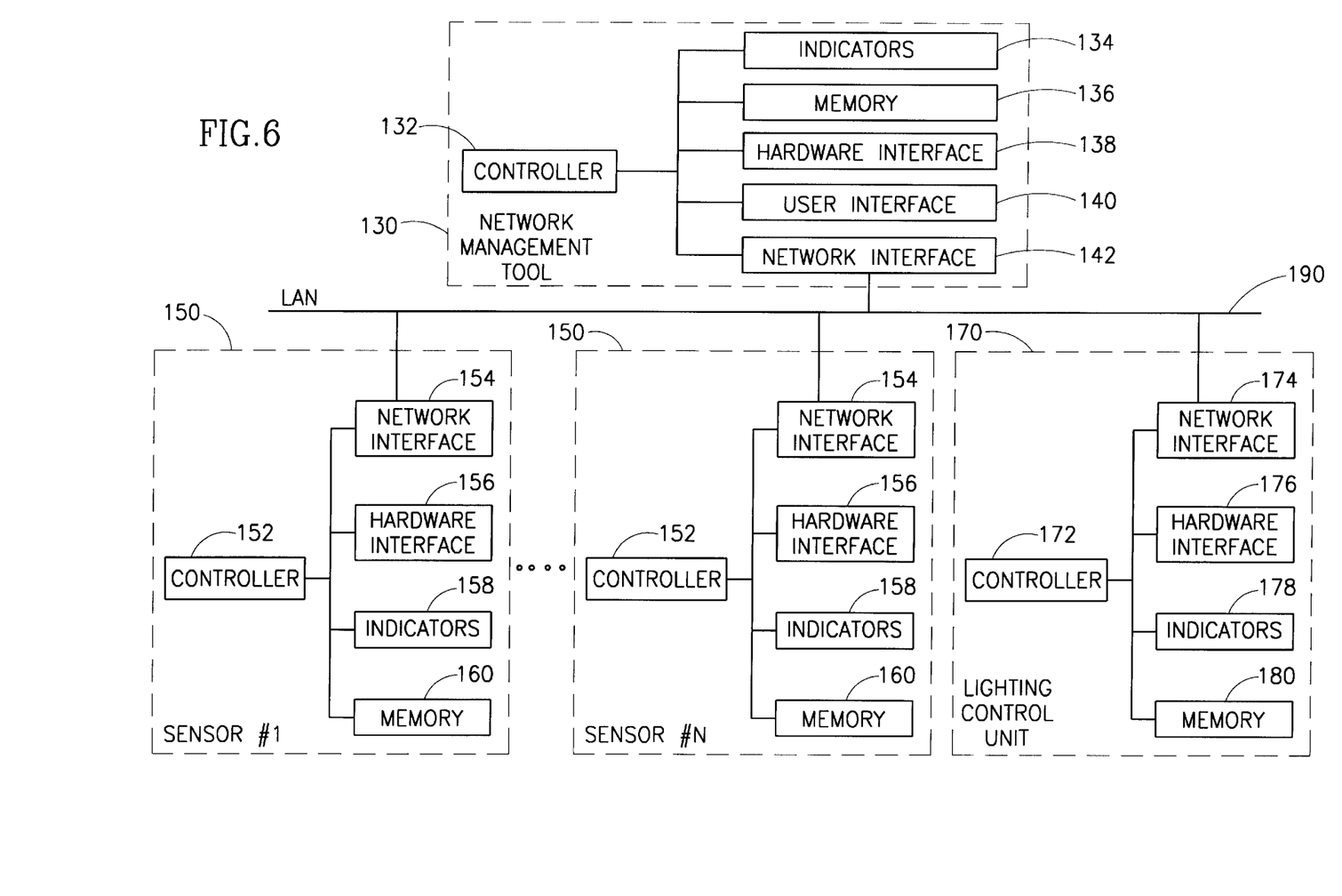
FIG. 6 is a block diagram illustrating the sensor, lighting control unit and a network management tool in more detail.

Another feature of the present invention is local and remote indication and control of the sensors and control unit or any other type of device that is capable of communicating on the network. Remote control and indication is provided by any device that is suitably programmed and adapted to communicate over the network, such as a network management tool. A block diagram illustrating the sensor, lighting control unit and a network management tool in more detail is shown in FIG. 6. Each of the network management tool 130, sensors #1 through #N 150 and the lighting control unit 170 communicate over a network LAN 190. If the network comprises a LonWorks compatible network the LAN may be implemented over any suitable media such as power line carrier, RF, twisted pair, fiber optic cable or infrared.

The network management tool 130 comprises a network interface 142 for communicating over the LAN 190 and includes the necessary hardware and software components. The user interface 140 provides the functionality for a user to interface with the management tool. The network management tool may include a video screen, keyboard, pointing device, one or buttons, user interface software, etc. A hardware interface 138 comprises both the hardware and the related software required to interface to the hardware. Hardware may include buttons, switches, slides, peripherals or any other type of hardware device.

A controller 132 executes the system and application software that runs the network management tool. The application software includes network diagnostic software that provides management functions such as the monitoring and control of any management enabled device connected to the network. A device must be adapted to be able to managed remotely. One suitable management protocol is the well known Simple Network Management Protocol (SNMP) which includes agents which reside in the device to be managed. A memory module 136 provides storage capabilities for the network management tool. The memory module 136 may comprise RAM, ROM, non volatile RAM, EPROM, EEPROM, etc. The memory is utilized by the controller to store program data and variable data including profile settings and network variable values.

One or more indicators 134 provide an indication function to a user and are controlled by the controller 132. The indicators 134 may comprise audible and/or visual indication such as a buzzer, bell, siren, LED, light, flasher, strobe, video screen indications, etc.

The sensors 150 comprise a network interface 154 for communicating over the LAN 190 and include the required hardware and software components for communication to occur. A hardware interface 156 comprises both the hardware and the related software required to interface to the hardware. Hardware may include buttons, switches, slides, peripherals or any other type of hardware component or device.

A memory module 160 provides storage capabilities for the network management tool. The memory module 160 may comprise RAM, ROM, non volatile RAM, EPROM, EEPROM, etc. The memory module 160 is utilized by the controller 152 to store program data and variable data including profile settings and network variable values.

One or more indicators 158 provide an indication function to a user and are controlled by the controller 152. The indicators 158 may comprise audible and/or visual indication such as a buzzer, bell, siren, LED, light, flasher, strobe, video screen indications, etc.

The controller 152 executes the system and application software that runs the sensor. The application software includes the algorithms used to read and process the sensor 150 data received. In addition, the application software performs management and diagnostic functions such as self test of the device and monitoring of its operating state. In addition, the software includes the ability to provide local or remote diagnostic and management functions. Diagnostic functions may include both local periodic status checks, i.e., self test functions, and remotely initiated test functions such as from a network management tool 130. Thus, the sensor 150 is adapted to permit a remotely located network management tool to monitor and control the sensor. One suitable management protocol is the well known Simple Network Management Protocol (SNMP) which includes an agent which reside in the sensor.

The lighting control unit 170 comprise a network interface 174 for communicating over the LAN 190 and include the required hardware and software components for communications to occur. A hardware interface 176 comprises both the hardware and the related software required to interface to the hardware. Hardware may include buttons, switches, slides, peripherals or any other type of hardware component or device. The hardware interface also comprises means for controlling an electrical load connected to the control unit 170.

A memory module 180 provides storage capabilities for the network management tool. The memory module 180 may comprise RAM, ROM, non volatile RAM, EPROM, EEPROM, etc. The memory module 180 is utilized by the controller 172 to store program data and variable data including profile settings and network variable values. The sensors, network management tool and control units function to save their data and their current operating state in the event of a power failure and subsequent restart.

One or more indicators 178 provide an indication function to a user and are controlled by the controller 172. The indicators 178 may comprise audible and/or visual indication such as a buzzer, bell, siren, LED, light, flasher, strobe, video screen indications, etc.

The controller 172 executes the system and application software that runs the lighting control unit. The application software includes the algorithms used to read and process the data received locally and from the network. In addition, the application software performs management and diagnostic functions such as self test of the device and monitoring of its operating state. In addition, the software includes the ability to provide local or remote diagnostic and management functions. Diagnostic functions may include both local periodic status checks, i.e., self test functions, and remotely initiated test functions such as from a network management tool 130. Thus, the lighting control unit 170 is adapted to permit a remotely located network management tool to monitor and control the unit. One suitable management protocol is the well known Simple Network Management Protocol (SNMP) which includes an agent which reside in the sensor.

An important aspect of the present invention is that the device can be placed into an off, standby, etc. mode (1) either locally or remotely by way of a local mechanical or electrical switch on the device itself or (2) remotely over the network via one or more control commands.

It is important to note that while the device is performing functions initiated whether locally or remotely, the software means within the device performs the following functions autonomously or via commands received from a remote device, e.g., a management entity: (1) continuous, scheduled or random self test of any or all functions within the device or slave device with the generation of a go/no go control signal and (2) a continuous, scheduled or random diagnostic test of the software and hardware performance of the device, including the generation of an indication of whether each function is working properly within the specification of the device or is inside or outside a window of acceptance or is nearing to, drifting from or is outside the device specifications.

A remote of local indication and control signal can be sent to any device on the network. This signal can subsequently be utilized to open a load circuit breaker or be used to activate a visual or audible indicator or warning signal.

In particular, the self test diagnostic capability can be initiated by the pressing of a local test button on the device which when activated could trigger a test of the relay inside the device. In response to the test, a local and remote control signal can be sent. In the event the device fails the test, the remote indication control signal causes a circuit breaker located upstream to open and also activates a visual and/or audible indication that the device being tested has failed and that its relay or trip detection circuitry is malfunctioning.

Another important aspect of the present invention is local and remote indication of events that occur both in the sensors and in the control units. For example, when a sensor is placed in the off mode (device override mode), standby mode, etc., an indication that this event has occurred is provided in the sensor that was placed in the off mode, the other sensors that are now inhibited and in the control unit bound to the sensors. Different flash rates can be used to distinguish the devices. For example, the device that was placed in the off mode can have its indicator flash at a rate different from that of the indicators on the other devices on the network that are logically bound together to the same control unit.

Local and remote signaling, control and indication (on a network management tool, for example) is also provided when any device is being tested and/or fails or passes the tests. In addition, local and remote signaling, control and indication is also provided when a device fails, it is determined that a device requires testing or a device is determined to be in a degraded state (i.e., is about ready to fail). For example, via diagnostics initiated either locally or remotely via a network management tool, a sensor may determine that its field of view has degraded for some reason, one of its buttons is not operating properly, a relay is not functioning properly, etc. In such a case, the device can report its status to the management tool and/or activate a local or remote indicator to alert personnel that a problem exists.

Calibration of the device can also be initiated either locally and/or remotely via the network. In addition, calibration can be performed automatically at power up, initiated by a field service technician or initiated periodically locally by the device or remotely by a management tool.

Further, the device includes means for placing it in an off or override state by other than the mechanical means provided on the device itself, as described hereinabove. Thus, via software means within the device, a management tool may remotely place the device in the override mode such as during routine maintenance, emergency situations, daily operating procedure, etc. The device also includes means other than via the mechanical switch or pull tab to locally place the device in an override state. Such means may comprise electronic switch or standard communication interface means such as RS-232, RS-485, universal serial bus (USB), etc.

While the invention has been described with respect to a limited number of embodiments, it will be appreciated that many variations, modifications and other applications of the invention may be made.

What is claimed is:

1. A method of controlling power distribution to a load in an electrical network, the electrical network having a plurality of input devices operable in an on state and an off state, and an electrical control device responsive to the state of the plurality of input devices and used to control power distribution to the load, said method comprising:

placing at least one of said plurality of input devices into the off state;

communicating from said at least one input device placed in the off state to said electrical control device a status message that said at least one input device is in the off state, wherein said electrical control device turns power to the load off;

inhibiting said electrical control device from turning power to the load on until each of said plurality of input devices are in the on state;

maintaining a table of input device identifiers;

adding the input device identifier associated with said at least one input device placed in the off state to said table;

removing the input device identifier associated with said at least one input device placed in the off state from said table when said at least one input device placed in the off state is placed in the on state; and enabling said electrical control device to activate said load when each input device identifier has been removed from said table.

2. The method according to claim 1, wherein said input device identifier comprises an address of said at least one input device in the off state.

3. A method of controlling power distribution in an electrical network having a plurality of input devices operable in an on state and an off state and an electrical control device responsive to the state of the plurality of input devices and used to control power distribution to the load, wherein said input devices and electrical control device are adapted to communicate over a communications network, said method comprising the steps of:

inhibiting at least one of said plurality of an input devices from sending a message to said electrical control device to turn power on to the load in response to it being placed in the off state;

transmitting an inhibit message from said at least one input device in the off state to said electrical control device;

turning power to the load off in response to said inhibit message;

inhibiting said electrical control device from responding to messages from any of said plurality of input devices to turn power on to said load until each of the plurality of input devices in the on state;

transmitting a feedback inhibit message from said electrical control device to each of said plurality of input devices, wherein each input device responds to said feedback inhibit message by inhibiting the sending of the message to said electrical control device to turn power on to said load until each of said plurality of input devices are in the on state;

maintaining a table of input device identifiers within said electrical control device;

adding an identifier associated with each input device placed in the off state to said table when such input device has been placed in the off state;

removing the identifier associated with such input device placed in the off state from said table when such input device has been placed in the on state; and enabling said electrical control device to turn power on to said load when all input device identifiers have been removed from said table.

4. The method according to claim 3, wherein said input device identifier comprises an address of an input device placed in the off state.

5. An electrical network including a plurality of input devices operable in an on state and an off state, an electrical control device responsive to the state of said plurality of input devices, a load and a power control system capable of controlling power distribution to the load, said power distribution system comprising:

means for placing at least one of said plurality of input devices into the off state;

means for communicating from said at least one input device in the off state to said electrical control device a message representing that said at least one input device is in the off state, and wherein said electrical control device turns power to the load off when said message is received;

means for inhibiting said electrical control device from turning power on to the load until each of said plurality of input devices are in the on state;

a table for storing input device identifiers;

means for storing an identifier associated with an input device to said table when an input device is placed in the off state;

means for removing the identifier associated with an input device from said table when said input device is placed in the on state; and means for enabling said electrical control device to turn power on to said load when all input device identifiers have been removed from said table.

6. The power distribution system according to claim 5, wherein said input device identifier comprises an address of said input device.

* * * * *